(12) United States Patent
Gassmann et al.

(10) Patent No.: US 6,653,578 B1
(45) Date of Patent: Nov. 25, 2003

(54) TRACK SCALES WITH CONTINUOUS RAILS AND WEIGHING SLEEPERS

(75) Inventors: Helmut Gassmann, Seeheim-Jugenheim (DE); Joachim Hose von Wolfframsdorff, Seeheim-Jugenheim (DE)

(73) Assignee: Pfister Waagen Bilanciai GmbH, Augsburg (DE)

( * ) Notice: Subject to any disclaimer, the term of this patent is extended or adjusted under 35 U.S.C. 154(b) by 0 days.

(21) Appl. No.: 09/830,107

(22) PCT Filed: Oct. 20, 1999

(86) PCT No.: PCT/EP99/07966

§ 371 (c)(1),
(2), (4) Date: Jun. 11, 2001

(87) PCT Pub. No.: WO00/23770

PCT Pub. Date: Apr. 27, 2000

(30) Foreign Application Priority Data

Oct. 20, 1998 (DE) .......................................... 198 48 119

(51) Int. Cl.[7] .............................................. G01G 21/22
(52) U.S. Cl. ....................................................... 177/163
(58) Field of Search ................................. 177/163, 211

(56) References Cited

U.S. PATENT DOCUMENTS

| | | | | |
|---|---|---|---|---|
| 3,575,248 A | * | 4/1971 | Bell ........................... | 177/163 |
| 3,592,278 A | * | 7/1971 | Shumaker et al. ........... | 177/163 |
| 3,734,216 A | * | 5/1973 | Nordstrom et al. ......... | 177/163 |
| 4,170,268 A | | 10/1979 | Nordstrom et al. ......... | 177/163 |
| 4,701,866 A | * | 10/1987 | Harrison et al. ............. | 177/163 |
| 4,834,199 A | * | 5/1989 | Bolland ...................... | 177/163 |
| 6,118,083 A | * | 9/2000 | Boyovich et al. ........... | 177/211 |

FOREIGN PATENT DOCUMENTS

| | | |
|---|---|---|
| DE | 2300 337 | 7/1974 |
| DE | 44 44 337 A 1 | 6/1996 |

* cited by examiner

*Primary Examiner*—Randy Gibson
(74) *Attorney, Agent, or Firm*—Knobbe, Martens, Olson & Bear, LLP

(57) ABSTRACT

Continuous, uninterrupted rails for trains and the like having weight measuring sections. Weighing ties replace normal ties under the rails in the weight measuring sections. The weighing ties are of the same height, width, and external contour as the normal ties. The weighing ties include weighing cells that can be laterally adjusted to accommodate various rail gauges. The weighing ties include a housing made of steel plate with a floor, sides, and a top with an opening therein. The weighing cells protrude through the openings in the housings to support the rails in the weight measuring section. Transverse force sensors are also provided in transverse holes in both ends of the weight measuring sections of the rails to determine the power shunt. The weighing cells and transverse force sensors are prefabricated and calibrated to improve accuracy and durability of the weighing cells and force sensors.

7 Claims, 1 Drawing Sheet

TRACK SCALES WITH CONTINUOUS RAILS AND WEIGHING SLEEPERS

BACKGROUND OF THE INVENTION

1. Field of the Invention

The present invention relates to track scales with uninterrupted, continuous rails which are supported in a weighing section of line on several weighing sleepers.

2. Description of the Related Art

The purpose of such track scales is to weigh railway wagons as they travel over the weighing section of line. In the interests of adhering to a preset weighing precision it is important that the wagons do not vibrate as they travel over the weighing section of line, because this would effectively falsify the weighing result. Accordingly, a long straight section of track is required into which the weighing section of line is incorporated. In this particular region the track bed should be as uniformly elastic as possible so as not to excite any vibrations.

Furthermore, the line nay not exhibit any shocks in this region. The influence of leading and trailing wheels Is considerable and must be detected in principle by the weighing system. Changes in the rigidity of the track bed may not cause any increase in the calibration error.

In the case of known track scales of the type initially described (U.S. Pat. No. 4,170,268) the sleepers in the vicinity of the weighing section of line are designed as special weighing sleepers. They essentially comprise double-T bearers which are laminated with wire Strain gauges and are supported at their ends on a relatively large rail bed comprising steel-reinforced concrete.

The bending strain of the double-T bearers detected by the wire strain gauges delivers a mass of the weight forces acting on the rails by way of the wagon wheels.

Since the line of rail runs uninterrupted, it is necessary to record those portions of the weight transferred by the rails in the non-measuring normal sleepers adjacent to the weighing section of line, which represent a power shunt for weighing.

In many cases such track scales are incorporated into a line of rail as a subsequent measure, whereby the continuous rails remain Intact. To incorporate the weighing sleepers the track bed in the vicinity of the weighing section of line must be partly removed and then replaced after the weighing sleepers have been set in. This means a change in the rigidity of the track bed in the vicinity of the weighing section of line. The larger deformations in the rail in this section are the cause of undesired vibrations of the wagons which render measuring results inaccurate.

Even when the track scales are not added at a later date, but are incorporated during railway construction, the substantially greater structural height of the weighing sleepers of the known track scales, as compared to the normal sleepers, indicates a changed rigidity in the track bed in the vicinity of the weighing section of line.

SUMMARY OF THE INVENTION

In the case of the known track scales direct application of the wire strain gauges to the double-T bearers of the weighing sleepers leads to increased susceptance to failure, because it is very difficult to protect these wire strain gauges adequately against environmental influences. Besides, the material of the double-T bearers or of the rails is little suited as a deformation body for a sensor contributing to the weighing process. The necessity of having to apply the wire strain gauges under unfavourable conditions on site also impedes attainable weighing accuracy.

The double-T bearers of the weighing sleepers serving as weighing elements are relatively large components whose handling poses difficulties during manufacture. Their rigidity is relatively low, since they are stressed according to the bending beam principle. This too can lead to substantial deviation In the rigidity of the line of rail in the vicinity of the weighing section of line compared to the adjacent regions. Disengaging disturbances, such as moments of flexion and transverse forces, are not possible on the double-T bearers, or only inadequately so. The dimensions of the double-T bearers make their capacity to be tested more difficult.

The operating procedures required on site at time of assembly of the track scales, in particular the application of the wire strain gauges, result in highly expensive and lengthy assembly, requiring prolonged blocking of the section of rail concerned. Subsequent shifting of the track scales is possible only at considerable expense.

The object of the present invention is therefore to produce track scales of the type described at the outset, such that they can be incorporated into a section of rail easily and inexpensively by having their components prefabricated to the greatest possible extent and in particular such that there is no change in rigidity influencing the weighing result in the vicinity of the weighing section of line.

This task is solved by the present invention in that, in terns of their height and width, the weighing sleepers correspond to the normal sleepers which have been replaced in the weighing section of line and respectively exhibit two weighing cells supporting both rails, and in that transverse force sensors arranged at the ends of the weighing section of line are prefabricated measuring elements introduced into a transverse borehole of the rail stem.

The effect of the weighing sleepers in terms of height and width adapting to the normal sleepers is that due to exchange of the sleepers there is no change to the native ballast underneath the sleepers and accordingly no change in the rigidity of the ballast underneath the weighing section of line, as compared to the adjacent ballast. This applies in particular where the track scales are Incorporated at a later date into an existing section of rail But even when the track scales are already provided when the section of rail is being laid the constant external dimensions of the normal sleepers and of the weighing sleepers mean that the structure and the dimensions of the track bed are identical in the vicinity of the weighing section of line and in the adjacent areas, so that there is no change In rigidity in the vicinity of the weighing section of line.

All measuring elements used for the weighing procedure, namely the weighing cells in the weighing sleepers and the transverse force sensors set into the transverse boreholes of the rail stems, can be manufactured using customary manufacturing methods ensuring high measuring accuracy and can be checked prior to installation. Independent of the condition and manufacturing quality of all the weighing sleepers weighing cells are used for weighing which are optimised for this application and in particular are free from interfering moment of flexion influences and transverse force influences.

All components of the track scales can be easily dismantled without damage and reused at another site. This enables the track scales to be relocated at relatively low expense.

According to a preferred embodiment of the invention provision is made for each weighing sleeper to exhibit a sleeper housing, on whose housing floor the weighing cells are supported which project through openings on the upper side of the sleepers and bear the rails. This creates an arrangement of the weighing cells which has considerable protection, whereby the external contours and dimensions of the weighing sleepers can be adapted to the normal sleepers to the greatest extent possible.

In particular, it is an advantage for the sleeper housings to at least display an external contour corresponding to the normal sleepers which are replaced in the weighing section of line on the housing floor and the connecting side walls of the housing.

An embodiment of the invention will now be explained In greater detail hereinbelow as illustrated in the diagram, in which:

DETAILED DESCRIPTION OF THE PREFERRED EMBODIMENT

Figure 1:
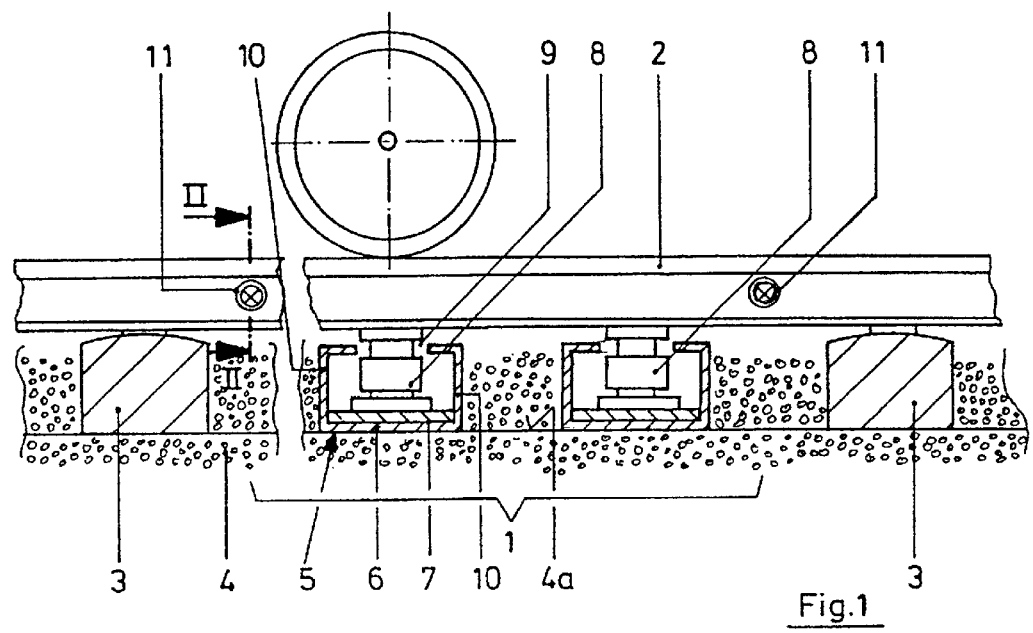
FIG. 1 shows a section of rail in a longitudinal section, in which a weighing section of line is realised.
Figure 2:
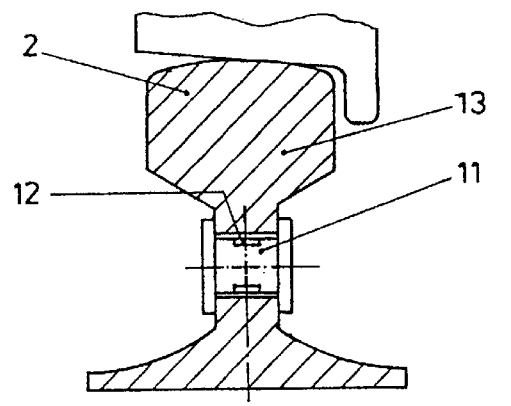
FIG. 2 shows an enlarged section along line 11—11.

The section of rail illustrated in FIG. 1, in which a weighing section of line 1 is realised, presents uninterrupted continuous rails 2. Whereas rails 2 in the areas adjoining the weighing section of line 1 in a conventional manner rest on normal sleepers 3 in a ballast track bed 4. rails 2 in weighing section of line 1 are supported on two or more weighing sleepers 5. Each weighing sleeper 5 presents a sleeper housing 6 comprising steel plate, as in the illustrated embodiment, on whose housing floor 7 two weighing cells 8 are supported. Weighing cells 8 project through openings 9 in the upper side of the sleepers and bear rails 2.

Weighing cells 8 are arranged such that they are insensitive to moments of flexion and transverse forces. In their structure weighing cells 8 correspond to conventional calibratable weighing cells. They are calibrated during factory manufacture.

In terms of their height and width weighing sleepers 5 are adapted to adjacent sleepers, or to normal sleepers 3 which are replaced in weighing section of line 1. On housing floor 7 and connecting side walls 10 of the housing they display at least an external contour corresponding to the external contour of the replaced or adjacent normal sleepers 3.

With subsequent installation of track scales in a section of rail no change is made to native ballast 4, on upper edge 4a of which rest both normal sleepers 3 and weighing sleepers 5 inserted in their place. In this way ballast 4 retains its rigidity unaltered.

The same external contours of sleepers 3 and of weighing sleepers 5 also enable easy exchange. Normal sleepers 3 are withdrawn laterally in the provided section of weighing section of line 1 and replaced by insertion of weighing sleepers 5, at which point rails 2 are fastened in place by use of conventional fastening materials to fasten weighing cells 8 likewise inserted laterally. The lateral adjustment of weighing cells 8 to the gauge of rails 2 or the distance between rails can be made easily, as can the adjustment of weighing cells 8, precisely beneath rail 2. This is important for optional exchange of a weighing cell 8, or for adapting each prefabricated, same-length sleeper housing 6 to different gauges.

For determining the power shunt with uninterrupted, continuous rails 2 transverse force sensors 11 are incorporated at both ends of weighing section of line 1. Transverse force sensors 11. likewise prefabricated and factory-calibrated together with weighing cells 8, are introduced in a positive locking manner into transverse boreholes 12 of rail stems 13 of rail 2. All that is required to mount transverse force sensors 11 is to realise transverse boreholes 12 on rails 2. Manufacturing transverse force sensors 11 in the factory enables them to be designed such that they satisfy all requirements for a measuring element used in the field, such as density, temperature independence and easy assembly.

By running together any number of weighing sleepers 5 bogies and entire wagons can be weighed. Weighing errors are reduced by the resulting longer measuring section and errors caused by weight transfer from one axle to the other are completely eradicated.

What is claimed is:

1. Track scales with uninterrupted continuous rails comprising:

a plurality of normal sleepers;

a plurality of weighing sleepers interposed between and replacing normal sleepers in positions corresponding to standard positions for the normal sleepers wherein the weighing sleepers have similar height and width as the normal sleepers and wherein the weighing sleepers each comprise two prefabricated weighing cells supporting the uninterrupted continuous rails;

a weighing section of rail overlying the plurality of weighing sleepers and supported by-the two prefabricated weighing cells of each weighing sleeper wherein the weighing section of rail has a transverse borehole positioned at each end of the weighing section of line in a stem of the rails; and transverse force sensors comprising prefabricated measuring elements introduced into the transverse boreholes.

2. The track scales of claim 1, wherein each weighing sleeper comprises a sleeper housing having a housing floor wherein the weighing cells are supported on the housing floor so as to project through openings in an upper side of the sleeper housing such that the weighing cells bear the rails and wherein the weighing cells can be shifted and adjusted laterally along the housing floor.

3. The track scales of claim 2, wherein the sleeper housings is continuous with a U-shaped hollow cross-section and wherein the housing floor and connecting side walls of sleeper housing have an external contour corresponding at least to corresponding sections of the normal sleepers.

4. The track scales of claim 1, wherein the weighing cells and the transverse force sensors are precalibrated.

5. A railroad track comprising:

a ballast track bed defining a plurality of sleeper positions extending the length of the track;

a plurality of normal sleepers positioned in outboard sleeper positions;

at least two weighing sleepers interposed between the normal sleepers so as to occupy inner sleeper positions wherein the weighing sleepers comprise at least two weighing cells;

at least two rails each having a stem section having transverse holes wherein the rails overlie and are supported by the normal sleepers and the weighing cells of the weighing sleepers wherein the rails extend in a continuous, uninterrupted manner the length of the track and wherein a section of track overlying the weighing sleepers defines a weighing section of track having a first end and an opposite, second end; and a plurality of transverse force sensors positioned within the transverse holes in the stems of the rails and further located adjacent the first and second ends of the weighing section of track wherein the weighing cells and transverse force sensors are prefabricated.

6. The track of claim 5, wherein the weighing cells and the transverse force sensors are precalibrated.

7. The track of claim 5, wherein the weighing sleepers further comprise a sleeper housing having a floor, sides, and top wherein the top defines an opening and wherein the weighing cells are supported on the floor and extend through the opening and wherein the weighing cells can be laterally adjusted on the floor.

* * * * *